(12) United States Patent
Nalibotski

(10) Patent No.: US 8,711,207 B2
(45) Date of Patent: Apr. 29, 2014

(54) METHOD AND SYSTEM FOR PRESENTING LIVE VIDEO FROM VIDEO CAPTURE DEVICES ON A COMPUTER MONITOR

(75) Inventor: Boris Nalibotski, New London, CT (US)

(73) Assignee: A&B Software LLC, New London, CT (US)

( * ) Notice: Subject to any disclaimer, the term of this patent is extended or adjusted under 35 U.S.C. 154(b) by 695 days.

(21) Appl. No.: 12/978,627

(22) Filed: Dec. 26, 2010

(65) Prior Publication Data
US 2011/0157318 A1 Jun. 30, 2011

Related U.S. Application Data

(60) Provisional application No. 61/290,484, filed on Dec. 28, 2009.

(51) Int. Cl.
*H04N 13/02* (2006.01)

(52) U.S. Cl.
USPC .......................................................... 348/47

(58) Field of Classification Search
USPC .......................................................... 348/47
See application file for complete search history.

(56) References Cited

U.S. PATENT DOCUMENTS

| | | | | |
|---|---|---|---|---|
| 4,805,037 A * | 2/1989 | Noble et al. | ............... | 386/200 |
| 5,369,617 A * | 11/1994 | Munson | ............... | 365/219 |
| 5,446,496 A * | 8/1995 | Foster et al. | ............... | 348/441 |
| 5,808,629 A | 9/1998 | Nally | | |
| 5,914,711 A | 6/1999 | Mangerson | | |
| 6,088,052 A | 7/2000 | Guralnick | | |
| 6,175,373 B1 | 1/2001 | Johnson | | |
| 8,482,511 B2 * | 7/2013 | Goris et al. | ............... | 345/102 |
| 2007/0077033 A1* | 4/2007 | Shirai et al. | ............... | 386/107 |
| 2007/0229487 A1* | 10/2007 | Slavenburg et al. | ............... | 345/213 |
| 2008/0309660 A1* | 12/2008 | Bertolami et al. | ............... | 345/419 |
| 2010/0123727 A1* | 5/2010 | Kwa et al. | ............... | 345/522 |
| 2010/0149414 A1* | 6/2010 | Chen et al. | ............... | 348/447 |

OTHER PUBLICATIONS

PC Video Synchronization and Playback. Windows Hardware Developer Center [online]. Microsoft Corporation, 2001 [retrieved on Dec. 22, 2010]. Retrieved from the Internet: <URL: http://www.microsoft.com/whdc/archive/VidSynch.mspx>.

Nowlin, Video Frame Display Synchronization. Article [online]. Intel Corporation, 2009 [retrieved on Dec. 22, 2010]. Retrieved from the Internet: <URL: http://software.intel.com/en-us/articles/video-frame-display-synchronization/>.

* cited by examiner

*Primary Examiner* — Anner Holder

(57) ABSTRACT

One embodiment of a method and system for presenting artifact-free live video from video capture devices on a computer display including the step of using the vertical blanking interrupt signal of a display controller to generate a software trigger command for the video capture devices. The vertical blanking signal is further used to transfer acquired image frames to the graphic memory of the display controller during the vertical blanking interval. Other embodiments are described and shown.

14 Claims, 5 Drawing Sheets

METHOD AND SYSTEM FOR PRESENTING LIVE VIDEO FROM VIDEO CAPTURE DEVICES ON A COMPUTER MONITOR

CROSS-REFERENCE TO RELATED APPLICATIONS

This application claims the benefit of provisional patent application Ser. No. 61/290,484, filed 2009 Dec. 28 by the present inventor.

BACKGROUND

With recent advances in the computer technology, it became customary to use computer systems for presentation of live video from video cameras, X-ray detectors, infrared sensors, and other video capture devices. It is well-known in the art that, in order to present high quality video on the graphics display system, the frame rate of the latter must be synchronized with the frame rate of the incoming video stream. If there is no synchronization, a video artifact known as "tearing" occurs. Tearing, which becomes obvious on a highly dynamic video content, is caused by the next frame being written to graphics memory while a display controller is using it to display the previous frame.

To avoid tearing anomaly, the rendering of incoming video must be digitally synchronized with the display refresh rate by buffering incoming frames and using the vertical blanking signal of the display controller to update the graphic memory only during a vertical blanking interval. This results in an acceptable video quality in situations when the frame rate of the incoming video is significantly lower than the display refresh rate, but it creates another motion artifact known as "judder." Judder is caused by a necessity to skip or duplicate a video frame in order to maintain display synchronization, and it becomes especially obvious when the incoming frame rate is close to the display refresh rate. Even a slightest discrepancy between the incoming frame rate and the display refresh rate will eventually result in dropped or duplicated frames. For example, if the acquisition frame rate is 60.2 and the display refresh rate is 60, this will cause a frame drop every 5 seconds.

A number of prior art techniques has been proposed to minimize judder anomaly, such as temporal averaging, frame interpolation, or motion estimation, but these techniques do not completely avoid motion discontinuities and they introduce other image processing artifacts. It is clear that, in order to present an artifact-free video on a computer monitor, the graphics display system must be genlocked, or electrically coupled, with the video source. However, it is rarely possible nowadays to genlock a computer display to a video camera due to several reasons:

(a) conventional PC display controllers do not support external synchronization;

(b) digital video cameras rarely provide an output synchronization signal;

(c) if more than one camera is in use, genlocking them with a display controller would require a complex electrical solution not feasible for a conventional PC user.

Based upon the foregoing, it should be appreciated that there is a need for a computer system that can display live video free of aforementioned artifacts from one or several video capture devices without resorting to complex hardware solutions.

SUMMARY

In general, the present invention provides for an artifact-free display of live video from digital cameras, analog cameras, X-ray detectors, and other video capture devices by synchronizing their acquisition frame rate with the refresh rate of a display monitor and synchronizing the rendering of acquired video frames with the vertical blanking intervals of the monitor.

As known to those familiar with the art, modern video cameras with standardized interfaces (such as USB, IEEE-1394, GigE, CameraLink) can be triggered by a software trigger command sent to a camera interface driver, or by a hardware trigger signal applied to the external trigger port of the camera. It is also known in the art that a display driver can notify a software application of the initiation of the vertical blanking interrupt by a display controller.

According to one embodiment of the principles of the present invention, the vertical blanking signal of the display controller/driver (VSYNC) is used by a software application to generate a trigger command which is sent to a video camera connected to the computer. This ensures that the camera acquires images at a rate substantially equal to the monitor refresh rate and guarantees that no frame needs to be dropped or added during the video display, thus eliminating the judder anomaly. Furthermore, the same vertical blanking signal of the display controller/driver is used to eliminate the display-tearing artifact by transferring the acquired image frames from a memory buffer into the display controller only during the vertical blanking intervals of the monitor. A known in the art double buffer or FIFO memory allocation is used to prevent the previously acquired frame from being partially overwritten by the next frame.

In another embodiment of the principles of the present invention, a method is disclosed for displaying an artifact-free 3D live video obtained from two video cameras that are alternately triggered by the vertical blanking signal of the display controller. The vertical blanking signal is also used to alternately transfer video frames received from the left and right cameras to the display controller during the vertical blanking intervals. The vertical blanking signal is also used to toggle stereoscopic shutter glasses, thus alternately displaying images captured by the left and right cameras to the left and right eyes respectively.

The principles of the present invention advantageously provide substantial improvements over the prior art resulting in a very smooth TV-like presentation of live video on the computer monitor. It should be noted that this result can be achieved by utilizing a regular software application without a need for additional hardware or wiring.

DRAWINGS

DETAILED DESCRIPTION

Figure 1:
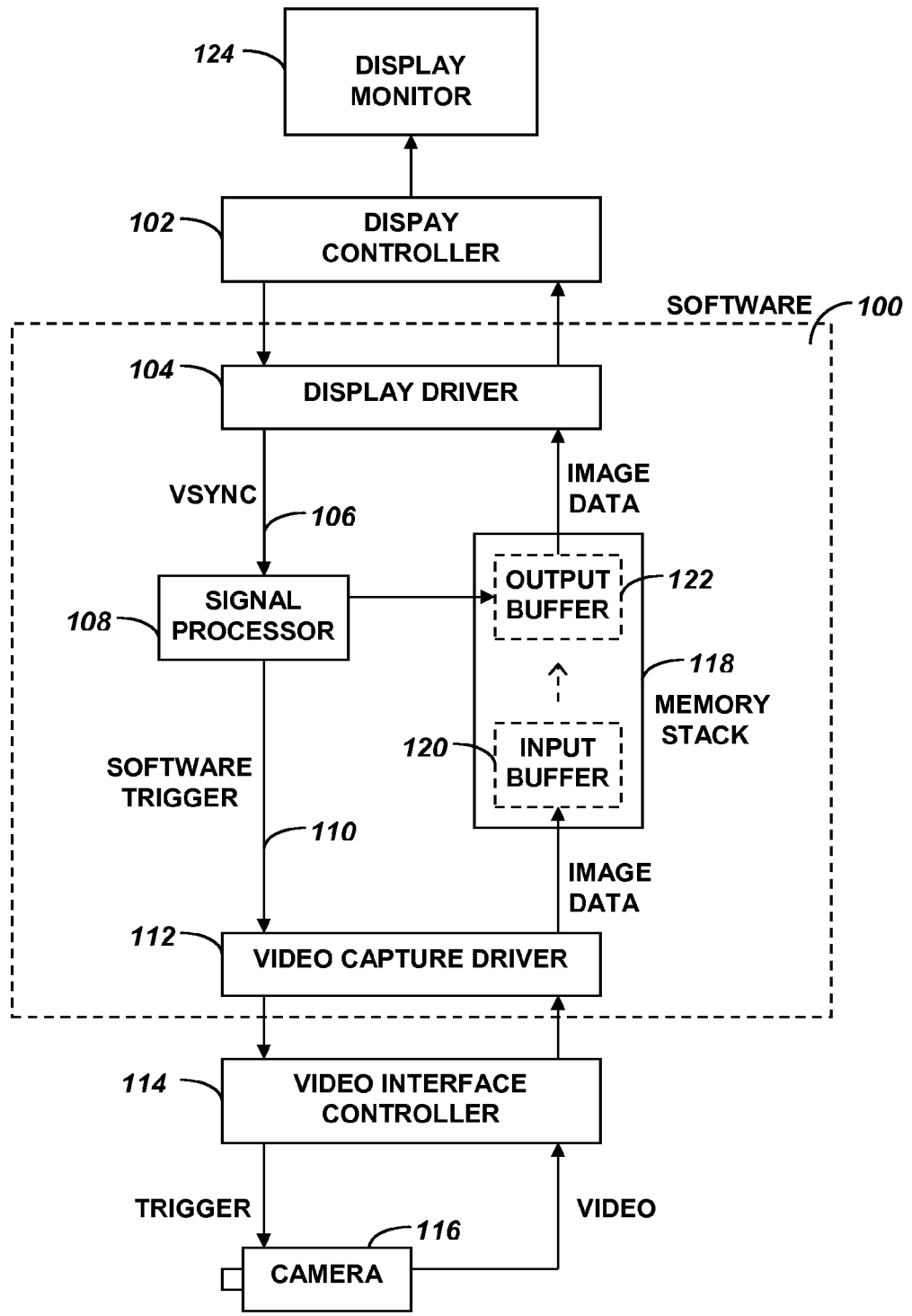
FIG. 1 is a high-level functional diagram showing a computer system displaying artifact-free live video from one video capture device.

FIG. 1 is a high-level functional diagram illustrating one embodiment of a computer system which includes a video camera 116, a video interface controller 114, a display controller 102, a display monitor 124, and software 100 comprising a display driver 104, a video capture driver 112, a signal processor 108, and a memory stack 118. In the present embodiment, display driver 104 and video capture driver 112 are included in an operating system or provided by manufacturers of display controller 102 and video camera 116. Signal processor 108 and memory stack 118 are typically implemented as part of a software application.

Display controller 102 generates a vertical blanking signal 106 (VSYNC) marking the beginning of a vertical blanking interval. Display driver 104 translates said signal to signal processor 108. In response to vertical blanking signal 106, signal processor 108 sends a software trigger command 110 to video capture driver 112 that converts software trigger command 110 into a trigger signal sent by video interface controller 114 to camera 116. This causes camera 116 to capture an image frame and to start transmitting image data to memory stack 118 through video interface controller 114 and video capture driver 112. Memory stack 118 utilizes a known in the art FIFO technique and consists of at least two frame buffers. At any given moment, one frame buffer in stack 118 is designated as an input buffer 120 that receives an incoming image frame from the video capture driver, whereas another frame buffer in stack 118 is designated as an output buffer 122 that contains complete image data from a previously acquired frame. In response to vertical blanking signal 106, signal processor 108 also initiates the transfer of the image frame from output buffer 122 to the graphic memory of display controller 102 followed by the rendering of said image frame on display monitor 124. As the output image frame is being rendered, video capture driver 112 continues transferring the incoming image frame from camera 116 to input buffer 120. When the transfer of the incoming image frame is complete, memory stack 118 advances the indices of its frame buffers, thus preventing the newly acquired image frame from being overwritten by the next frame to be acquired.

It should be noted that camera 116 in FIG. 1 represents any video capture device that can be triggered by a software command through a corresponding video driver/controller. Typical examples of such video capture devices are industrial analog and digital video cameras, infrared cameras, and X-ray detectors. Depending on the interface type of camera 116, video interface controller 114 can be a USB adapter, FireWire adapter, network adapter, or a specialty framegrabber.

As one familiar with the art would readily appreciate, memory stack 118 may utilize various buffering techniques such as double buffering, triple buffering, or circular buffering. In general, having two buffers is sufficient for the described embodiment, as the camera and display controller operate at substantially the same frequency. A higher amount of frame buffers in memory stack 118 may be needed to compensate for fluctuations in the acquisition frame rate that may occur due to a non-deterministic nature of the software execution and inherent latency of certain video acquisition interfaces, such as Gigabit Ethernet. One may also need to use multiple frame buffers when the system is used for other purposes besides a live video presentation. One example of such an implementation is a digital video recorder that stores a sequence of acquired image frames in the memory while displaying an artifact-free live video on the monitor.

Figure 2:
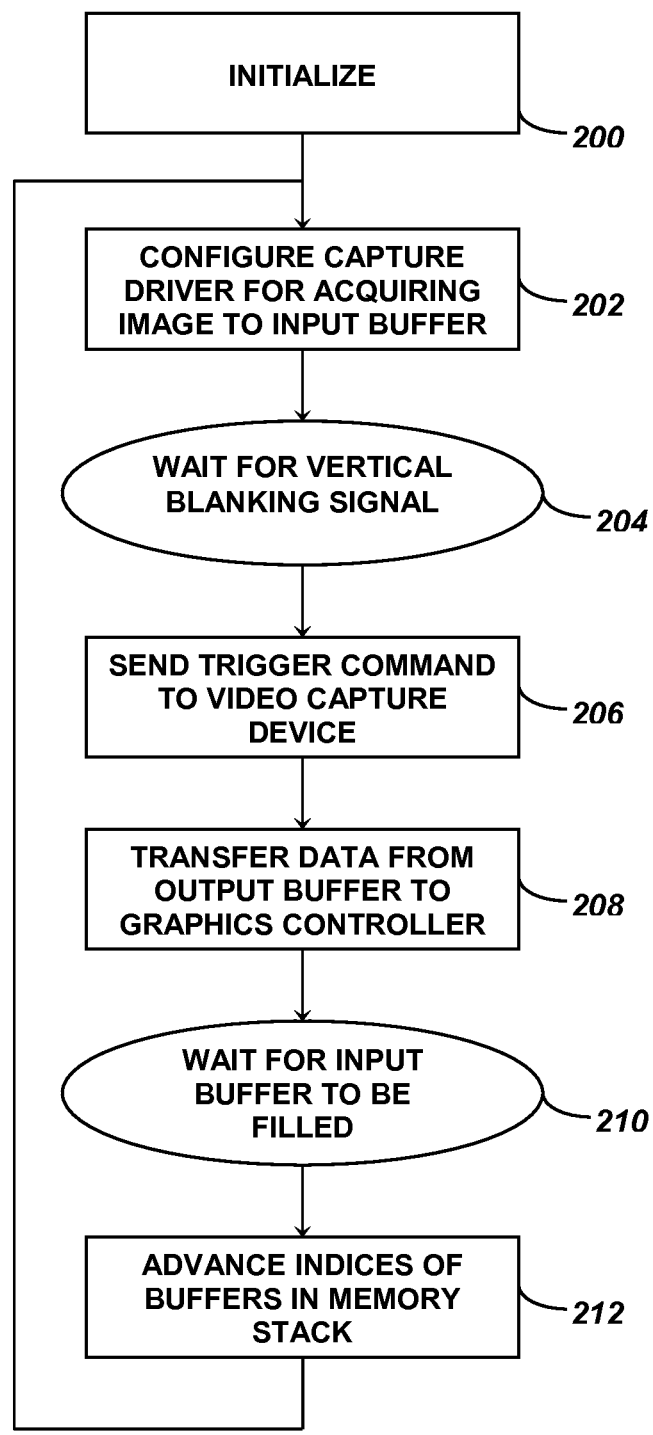
FIG. 2 is a flow chart describing a method of presenting artifact-free live video on a computer display.

FIG. 2 is a flow chart describing the proposed embodiment in terms of a software program. At step 200, the program performs an initialization by setting up acquisition parameters for the video capture device and allocating buffers in the memory stack. The buffer size is determined by a selected resolution and image format of the video capture device. Then an acquisition-display cycle starts at step 202 where the address of the input frame buffer is submitted to the video capture driver for an anticipated acquisition of an image frame. The cycle continues at step 204 by polling the display driver in anticipation of the arrival of the vertical blanking signal. One known in the art implementation of step 204 for Microsoft Windows operating system is a call to the DirectX function WaitForVerticalBlank( ) which blocks the execution of the program until the beginning of the next vertical blanking interval.

When the vertical blanking signal is received at step 206, the program sends the trigger command to the video capture driver initiating the acquisition of a new image and commencing its transfer to the input buffer. At step 208, the program transfers a previously captured image from the output buffer of the memory stack to the graphic memory of the display controller. It should be noted that the order of steps 206 and 208 is not significant, as they are executed substantially simultaneously. At step 210, the program enters a wait loop in anticipation of the completion of the transfer of the incoming video frame to the input buffer. One implementation of said loop known to those familiar with the art includes a call to a "wait for frame" function provided by the camera driver. Once the input buffer is filled, the program advances the indices of all frame buffers in the memory stack at step 212. If the memory stack consists of two frames, this will result in swapping the logical assignments of the input and output buffers, making the buffer with the newly acquired frame an output buffer. The program then returns to step 202 for the next iteration of the cycle.

Therefore, in the described embodiment, the vertical blanking signal of the display controller is utilized as follows:
(1) To commence the acquisition of images by the video capture device, making the acquisition rate substantially equal to the refresh rate of the graphics display, thus eliminating the judder anomaly.
(2) To synchronize the transfer of buffered frames to the graphic memory with the beginning of the vertical blanking interval, thus eliminating the tearing anomaly.

It should be appreciated that the rate of the trigger command generated by signal processor 108 in FIG. 1 may be adjusted to be a multiple or divisible of the rate of vertical blanking signal 106. This adjustment can be used to trigger video capture devices that need to be operated at the frame rate several times lower or higher than the monitor refresh rate. For example, a system containing a high-speed video camera may be required to capture and archive images at 120 frames per second, while the live video needs to be observed on a computer monitor with a 60 Hz refresh rate. The trigger signal must be applied to such a camera at a rate twice as high as the vertical blanking rate, the acquisition and rendering of every second frame being synchronized with the vertical blanking interval. In general, signal processor 108 should be capable of deriving the trigger signal from the vertical blanking signal by multiplying or dividing the vertical blanking rate by 2 or another positive whole number.

Figure 3:
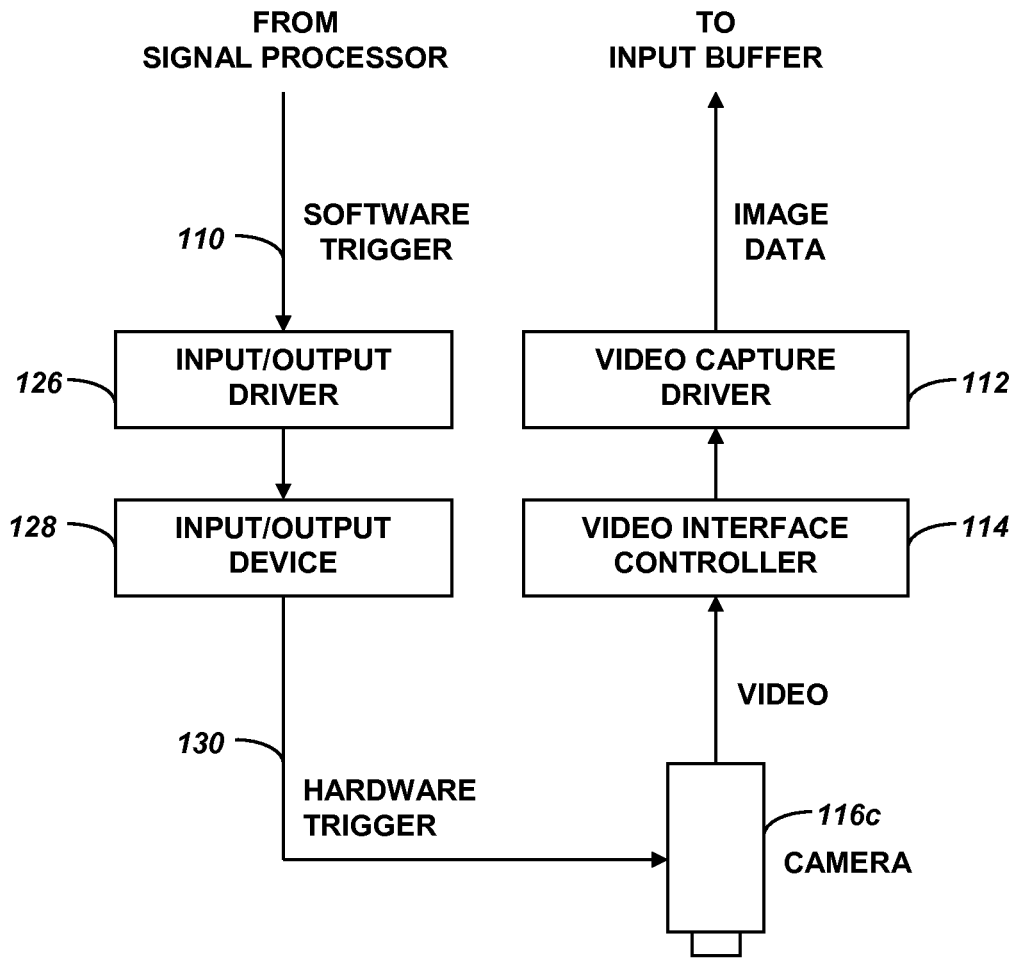
FIG. 3 is a partial diagram of an exemplary embodiment of the proposed system using a video camera that does not support software triggering.

As known to those familiar with the art, certain video capture devices may not support software triggering, but they will accept a hardware trigger signal on a dedicated trigger port. The principles of the present invention can be applied to such video capture devices through the use of software-controlled input/output devices, such as a GPIO board or USB digital I/O controller. FIG. 3 illustrates another embodiment of the present invention for a computer system that uses a video camera 116c with a hardware trigger port. Software trigger command 110 generated by the signal processor is sent to an input/output device 128 through an associated input/output driver 126. Said input/output device 128 generates a hardware trigger signal 130, which is applied to the trigger port of camera 116c. The camera captures an image frame and sends it through video interface controller 114 and video capture driver 112 to the input buffer. The remaining part of the system operates on the principles disclosed in the discussion of the first embodiment.

Figure 4:
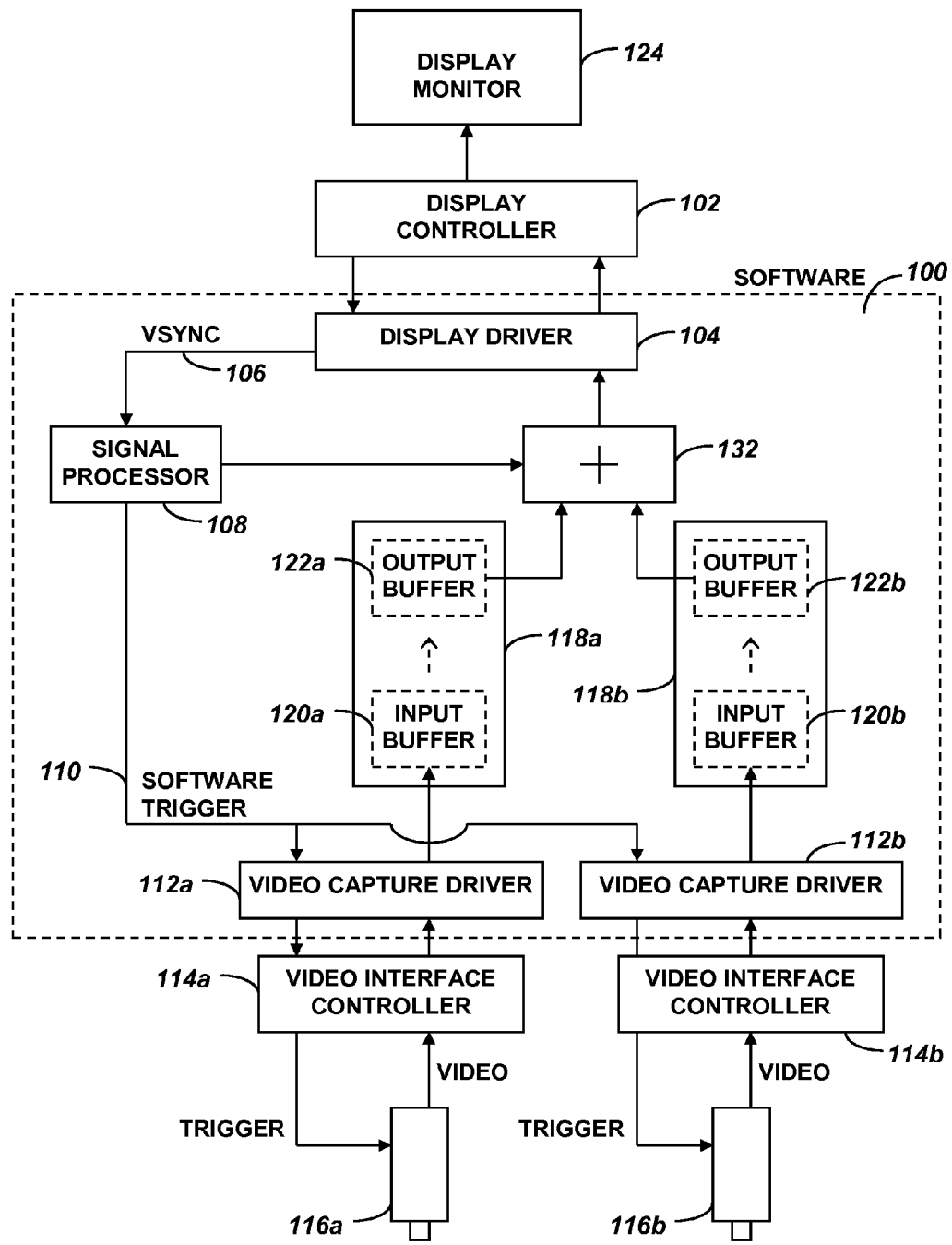
FIG. 4 is a high-level functional diagram describing a computer system for presenting artifact-free live video from two video capture devices.

FIG. 4 illustrates another embodiment of the current invention describing a system that displays artifact-free live video from two video cameras. In comparison to the first embodiment, the system is modified as to contain two video cameras 116a and 116b, two video interface controllers 114a and 114b, two video cameras 112a and 112b, and an additional software integrator 132. As previously discussed, signal processor 108 converts vertical blanking signal 106 obtained from display driver 104 into software trigger command 110, whereas the software trigger command in the present embodiment is sent to both cameras through the associated video capture drivers and video interface controllers. In response to the trigger, cameras 116a and 116b capture images substantially simultaneously and start transmitting them to memory stacks 118a and 118b using frame buffers 120a and 120b as input buffers. By this moment, output buffers 122a and 122b contain complete image frames captured in a previous cycle. Said integrator 132 combines both output frames into one composite frame and transfers it to the graphic memory of display controller 102 at the beginning of the vertical blanking interval for rendering on display monitor 124. When the transfer of the incoming images from the cameras to input buffers 120a and 120b is completed, the software advances the indices of the buffers in memory stacks 118a and 118b, as described in the discussion of the first embodiment, and the cycle starts over waiting for the next occurrence of vertical blanking signal 106.

The depicted embodiment can be easily extended to the case of three or more video capture devices. It should also be noted that there can be various implementations of the algorithm utilized by integrator 132 to combine the image data from output buffers 122a and 122b into one composite frame ready for rendering. For example, in a typical video surveillance implementation, the output frames associated with individual cameras may be placed next to each other in a multi-window frame. The integrator can also operate as a switch that makes it possible to select one of the connected video capture devices for live video display. In another implementation, two images from a pair of cameras can be merged into a composite frame as red and blue layers, providing an anaglyph-type 3D video presentation.

Figure 5:
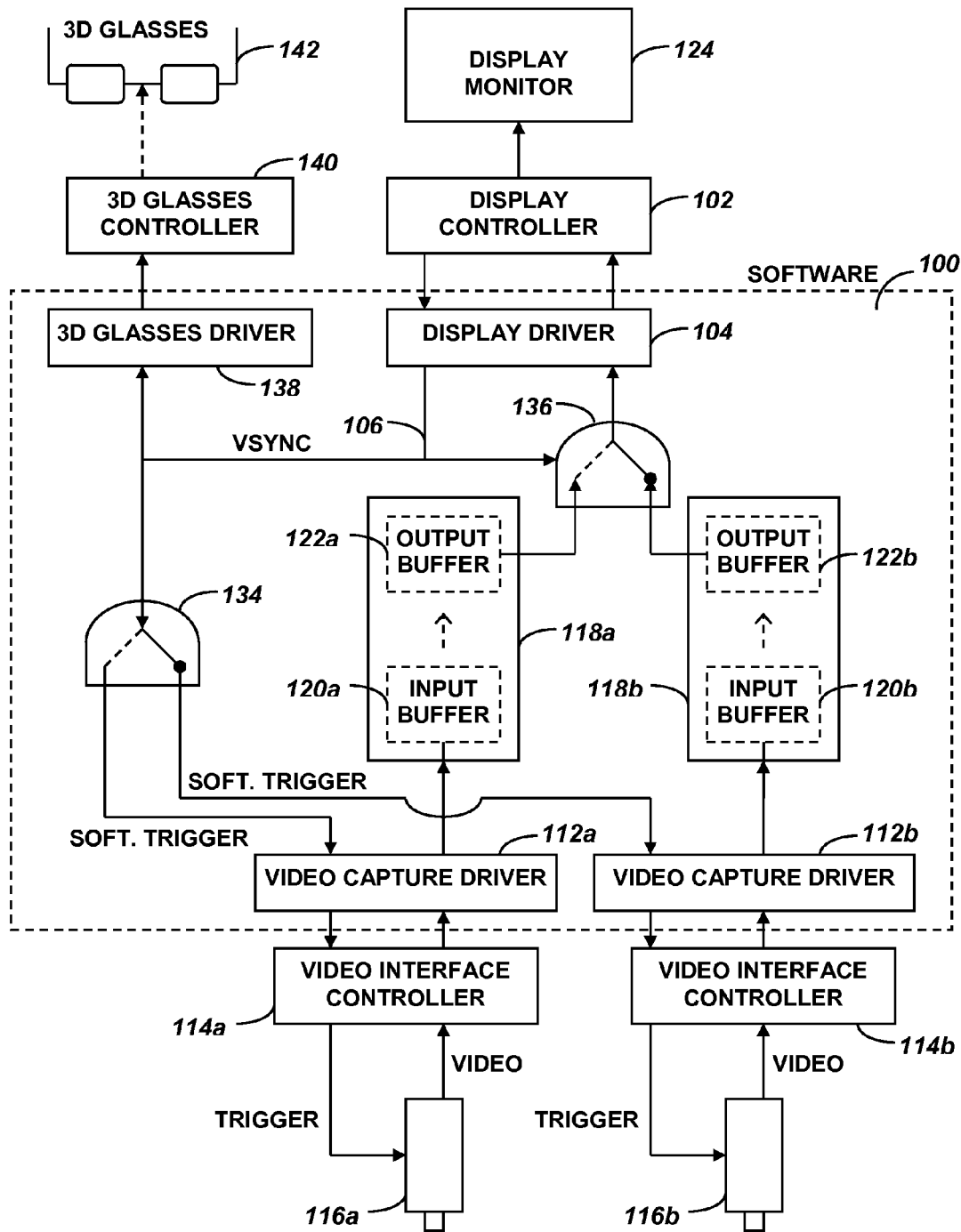
FIG. 5 is a high-level functional diagram describing a computer system for presenting artifact-free 3D live video.

FIG. 5 illustrates another embodiment of the current invention depicting a system for presenting artifact-free 3D live video from two cameras positioned to capture stereoscopic pairs of images. The system operates on the same principles as the one described in the previous embodiment, except that the trigger command is applied alternately to each camera by a software alternator 134 controlled by vertical blanking signal 106. This causes each camera to capture images at a rate equal to one half of the monitor refresh rate. The image data in output buffers 122a and 122b, each containing a frame previously captured by the associated camera, are transferred alternately to the graphic memory of display controller 104 in response to vertical blanking signal 106 being applied to a software switch 136. The vertical blanking signal is also applied to a shutter-glasses controller 140 through a shutter-glasses driver 138. This causes controller 140 to switch the optical state of stereoscopic shutter glasses 142 at the rate equal to the refresh rate of display monitor 124, thus alternately displaying images captured by one camera to the left eye and images captured by another camera to the right eye. In an alternative embodiment, both cameras can be triggered substantially simultaneously at half the rate of the vertical blanking signal. This will produce the result similar to alternated triggering.

Those familiar with the art should appreciate that all four video devices represented in the described embodiment—two video cameras, shutter glasses, and display monitor—are fully synchronized, and they operate at the same frequency. This provides a substantial improvement over the prior art, as the user of such a system will observe 3D live video without judder and tearing anomalies.

The preceding discussion has presented several embodiments of the method and system for presenting artifact-free live video from video capture devices on a computer display. Although the present invention has been described in terms of preferred embodiments, it will be appreciated that various modifications and alterations might be made by those skilled in the art without departing from the spirit and scope of the invention. For example, the functionality described above may be integrated in a dedicated standalone device or other hardware; certain parts of the software can be embedded in application-specific integrated circuits; a conventional computer monitor can be replaced by a light projector. The invention should therefore be measured in terms of the claims that follow.

What is claimed is:

1. A computer system for presenting artifact-free live video comprising:
    a display controller that repeatedly provides a vertical blanking signal;
    a display monitor connected to said display controller;
    at least one video capture device configured to commence the acquisition of an image frame in response to a trigger signal;
    memory means arranged into at least one FIFO stack of frame buffers comprising an input buffer for receiving acquired image data from said video capture device and an output buffer for storing a previously received image frame, wherein said FIFO stack is configured to advance the positions of its frame buffers after the filling of said input buffer with acquired image data is complete; and
    signal processing means configured to convert said vertical blanking signal into the trigger signal, said trigger signal applied to said video capture device at a rate substantially equal to a rate of said vertical blanking signal multiplied or divided by a whole positive number, wherein said signal processing means is also configured to transfer image data from said output buffer to the graphic memory of said display controller during the vertical blanking intervals of said display monitor,
    whereby the acquisition frame rate of said video capture device is synchronized with the refresh rate of said display monitor, the rendering of said image data is synchronized with the refresh cycle of said display controller, and live video is presented on said display monitor substantially without motion artifacts.

2. The system of claim 1, further comprising an input/output device controlled by the signal processing means and operable to provide a hardware trigger signal to the video capture device.

3. The system of claim 1, comprising a plurality of said video capture devices, wherein the trigger signal is applied to each of said plurality of video capture devices for commencing the acquisition of an image frame, and a plurality of said FIFO stacks each associated with one of said plurality of video capture devices, wherein the input buffer of each of said plurality of FIFO stacks is configured for receiving acquired image data from an associated one of said plurality of video capture devices.

4. The system of claim 3, further comprising an integrating means operable to combine image data from the output buffers of said plurality of FIFO stacks into a composite image frame and to transfer the content of said composite image frame to the graphic memory of the display controller in response to the vertical blanking signal.

5. The system for presenting artifact-free 3D live video from two video capture devices as recited in claim 3, further comprising a stereoscopic shutter glasses and a controller of shutter glasses, said video capture devices configured to capture stereoscopic pairs of images, the signal processing means configured to trigger said video capture devices in response to the vertical blanking signal, said signal processing means also configured to alternately transfer image data from the output buffers of the FIFO stacks to the graphic memory of the display controller in response to said vertical blanking signal, said vertical blanking signal applied to said controller of shutter glasses, said controller of shutter glasses configured to alternate the optical state of said shutter glasses in response to said vertical blanking signal.

6. A method for presenting artifact-free live video from at least one video capture device on a computer system having a display monitor controlled by a display controller, said display controller repeatedly providing a vertical blanking signal, comprising: configuring said video capture device to commence the acquisition of an image frame in response to a trigger signal, partitioning memory means of the computer system into at least one FIFO stack of frame buffers comprising an input buffer and an output buffer, and performing an acquisition-and-display loop until a system reset, said acquisition-and-display loop comprising the steps of:
 converting said vertical blanking signal to the trigger signal and applying said trigger signal to said video capture device at a rate substantially equal to a rate of said vertical blanking signal multiplied or divided by a whole positive number;
 commencing the transfer of acquired image data from said video capture device to said input buffer;
 transferring the content of said output buffer that contains a previously received image frame to the graphic memory of said display controller during the vertical blanking interval of said display monitor; and
 advancing the positions of the frame buffers in said FIFO stack after the filling of said input buffer with acquired image data is complete,
whereby the acquisition frame rate of said video capture device is synchronized with the refresh rate of said display monitor, the rendering of said image data is synchronized with the refresh cycle of said display controller, and live video is presented on said display monitor substantially without motion artifacts.

7. The method of claim 6, wherein the trigger signal is a software trigger command applied to a video interface controller, said video interface controller converting said software trigger command into a hardware trigger signal applied to the video capture device to commence the acquisition of an image frame.

8. The method of claim 6, wherein the trigger signal is a software trigger command applied to an input/output device, said input/output device converting said software trigger command into a hardware trigger signal applied to the trigger port of the video capture device to commence the acquisition of an image frame.

9. The method of claim 6 for presenting artifact-free live video from a plurality of said video capture devices, comprising applying said trigger signal to each of said plurality of video capture devices and providing a plurality of said FIFO stacks each associated with one of said plurality of video capture devices, wherein each of said plurality of FIFO stacks receives acquired image data from an associated one of said plurality of video capture devices.

10. The method of claim 9, further comprising the step or combining image data from the output buffers of said plurality of FIFO stacks into a composite image frame and transferring the content of said composite image frame to the graphic memory of the display controller in response to the vertical blanking signal.

11. A method for presenting artifact-free 3D live video on a computer system from two video capture devices positioned to capture stereoscopic pairs of images, the computer system having a display monitor controlled by a display controller, said display controller repeatedly providing a vertical blanking signal, comprising:
 configuring each of said video capture devices to commence the acquisition of an image frame in response to a trigger signal, partitioning memory means of the computer system into two FIFO stacks of frame buffers, each FIFO stack being associated with one of said video capture devices and comprising an input buffer and an output buffer, and performing an acquisition-and-display loop until a system reset, said acquisition-and-display loop comprising the steps of:
 converting said vertical blanking signal to the trigger signal and applying said trigger signal to said video capture devices at a rate substantially equal to a rate of said vertical blanking signal;
 commencing the transfer of acquired image data from each one of said video capture devices to the input buffer of an associated one of said FIFO stacks;
 alternately transferring image data from the output buffers of said FIFO stacks to the graphic memory of said display controller during the vertical blanking interval of said display monitor;
 applying said vertical blanking signal to a controller of stereoscopic shutter glasses, said controller alternating the optical state of stereoscopic shutter glasses; and
 advancing the positions of the frame buffers in each one of said FIFO stacks after the filling of its input buffer with acquired image data is complete,
whereby the acquisition frame rate of said video capture devices is synchronized with the refresh rate of said display monitor and with the switching rate of said shutter glasses, the rendering of said image data is synchronized with the refresh cycle of said display controller, and 3D live video is presented on said display monitor substantially without judder and tearing artifacts.

12. The method of claim 11, in which the trigger signal is applied alternately to each of said video capture devices.

13. The method of claim 11, in which the trigger signal is applied substantially simultaneously to both video capture devices in response to every second occurrence of the vertical blanking signal.

14. The system of claim 1, wherein said trigger signal is a software trigger command applied to a video interface controller, said video interface controller configured to convert said software trigger command into a hardware trigger signal applied to the video capture device.

* * * * *